July 18, 1939.  T. M. PRUDDEN  2,166,848

PANEL DAMPING STRUCTURE

Filed Feb. 6, 1937

Inventor,
Theodore M. Prudden

Patented July 18, 1939

2,166,848

UNITED STATES PATENT OFFICE 2,166,848

PANEL DAMPING STRUCTURE

Theodore M. Prudden, Hingham Center, Mass.

Application February 6, 1937, Serial No. 124,426

5 Claims. (Cl. 154—44)

This invention relates to an acoustical treatment of vibratory sound-emitting panels that may comprise a part of a room enclosure, as a vehicle body, for the purpose of damping or substantially reducing the vibration of such panel to quiet the room.

In a metal automobile body, for instance, usually there are a number of broad areas of metal sheet or panels that have a tendency to vibrate at audible frequency especially when the automobile is in motion and particularly when the natural or resonant vibration frequency of the panel is approximately the same as some period of sound vibration set up by the car. The panel also has a tendency to vibrate in response to external sounds and impacts as, for instance, rain on the metal roof of the car body and to transmit such audible vibrations to the air in the interior of the body, thereby rendering the interior of the body noisy.

It has been proposed heretofore to prevent the vibration of the panel by weighting it, as by a relatively heavy coating of asphalt or an asphalt impregnated sheet thereon, to change the mass and elasticity of the panel sufficiently to shift the resonant frequency thereof beyond the audible frequency range, or to a less objectionable audible frequency. The weight of the materials necessary for such treatment of the panel is objectionable.

An object of the present invention is the provision of an improved acoustical treatment for vibratile panels which is effective in damping or substantially reducing the vibration of the panel and which does not seriously increase the weight of the panel.

A further object of the invention is the provision of vibration damping means for a vibratile panel which damping means comprises one or more vibratile elements which are normally inherently non-responsive to the sound vibrations which actuate the panel but which are forced into motion by the vibrating panel and which by their motion dissipate the vibrant energy of the panel in inaudible forms of energy and hence damp the vibrations of the panel.

Another object of the invention is the provision of vibration damping or deadening means for a normally vibratory panel, having elements which are caused to vibrate or fan the surrounding air by the vibration of the panel, thereby to deaden the panel or to damp the amplitude of vibration thereof.

A further object of the invention is the provision of a panel and vibration damping means therefor generally in the form of a sheet which confronts the panel but in the main is spaced suitably therefrom except at its points of attachment to the panel, the points of attachment forming nodal points in the panel, thereby not only damping the amplitude of vibration of the panel but also changing the resonant period thereof.

The metal panels of an automobile body also transmit exterior heat to the interior of the body and in cold weather the interior heat to the exterior of the body by reason of the good heat conductivity of the metal.

It is a further object of the present invention to combine heat insulating means with panel deadening means for the purpose of insulating the interior of the automobile from both exterior noises and heat.

In applying a heat insulating medium to the automobile body in association with the panel deadening means it is a further object of the invention to utilize means providing a heat reflecting surface as the heat insulating means and to embody the heat reflecting surface as a part of the vibration damping means of the panel, the heat reflecting means preferably being spaced for the major part of its surface extent from the panel sufficiently to be effective.

A further object of the present invention is generally to improve upon panel deadening means.

The invention is herein illustrated as incorporated with the metal roof 10 of an automobile body, which roof is adapted to vibrate due to the vibration of the automobile and to exterior sounds and impacts, as rain. The panel damping means is applied to the under face of the roof, or that face that faces the interior of the body, and between the roof and the headlining 11, by which it is concealed. The invention, however, is not necessarily restricted in its application to the roofs of automobiles or other vehicles but can be applied to the vibratory panels or sheets forming a part of the automibile body and to vibratory panels in other structures such as buildings.

Figure 1:
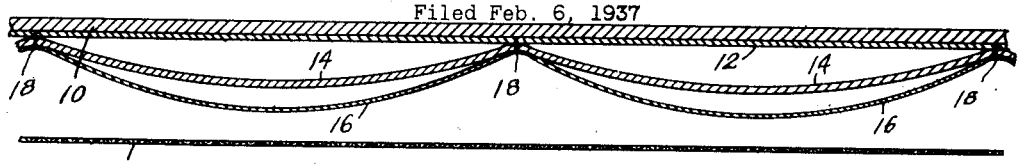
Fig. 1 is a sectional detail through a vibratory panel and the vibration damping means therefor.

The panel deadening or vibration damping means, in that form of the invention illustrated in Fig. 1, preferably, but for some constructions not necessarily includes a supporting sheet 12 of a length and width suitable for convenient manufacture and application to the panel. The supporting sheet 12 can be of any suitable structure and material but for cheapness it is preferred to be a paper sheet and preferably a creped kraft paper sheet for strength and conformability to the panel. Said kraft sheet 12 is adhesively affixed to the inner face of the panel 10 by any suitable adhesive preferably so that the kraft sheet is united with the panel substantially throughout the confronting areas of both.

The supporting sheet 12 carries one or more, preferably a plurality, of vibration damping or panel deadening sheets 14 and 16 that preferably are of different weights and hence have different resonant vibration periods and require different amounts of energy to set them into motion or to cause them to flutter back and forth. It is not intended that said sheets shall vibrate resonantly to the vibrations that actuate the panel but that they shall be forced to move or vibrate by the vibrating panel. The innermost sheet 14, for instance, can be an asphalt felt sheet, such as a so-called roofing felt which is a rather thick paper felt impregnated with asphalt. The outermost sheet 16 is a lighter paper sheet as a kraft paper. The sheets 14 and 16 are connected to the supporting sheet 12 at suitably spaced intervals say, for instance, four inches, by rows of stitching 18, which pass through all sheets. The sheets are assembled and stitched together in such manner that when the sheets are applied to the panel 10 they are draped or hang in spaced relation except where they are connected by the stitching. For some purposes the supporting sheet 12 can be omitted and the damping sheets can be adhesively affixed to the vibratile panels by lines of adhesive applied along the stitch lines. The spacing between the supporting sheet 12 and the innermost sheet 14 in the middle of the loop thereof is about three-sixteenth of an inch. The corresponding spacing between the sheets 14 and 16 is preferably around one thirty-second of an inch. The spacing can be varied, however, within rather wide limits.

The damping means is actuated by the panel to damp the vibrations thereof. When the panel vibrates the sheets 14 and 16 are forced to move up and down or to flutter or vibrate by reason of transfer of energy from the panel 10 to the damping sheets through the air space between the panel 10 and the panels 14 and 16 and also through the connection, as the lines of stitching, between the panel and the sheets. The sheet movement, as observed by the aid of a stroboscope is out of phase with the panel. This forced movement of the sheets absorbs energy from the panel and hence reduces the amplitude of the vibrations of the panel so that sound passed to the interior of the body from the panel is of reduced intensity. The energy taken by the sheets from the panel is absorbed in part by the internal friction of the sheet and in part by moving or fanning the surrounding air, so that the energy is dissipated in eddy currents and heating of the air or other non-audible ways. The lighter outer sheet 16 is set into motion principally by the smaller vibratory movement of the panel while the inner heavier sheet 14 is set in motion principally by the larger amplitude of vibration of the panel. Thus the sheets in combination are effective in damping the vibration of the panel both when the panel is weakly and also strongly vibrated and at a wide range of frequency, the energy of vibration of the panel thus being absorbed in the non-audible vibration or shaking of the sheets and in the heating and movement of the air that resists the shaking of the sheets. The two sheets are found to be more effective in damping panel vibrations than a single sheet, the sheets by their closeness and the small air space between them exerting a material damping action on each other. One sheet alone, as the sheet 14, has an effective damping action on the panel however.

The points of connection of the sheets 14 and 16 with the panel at the stitch lines 18 form nodal points in the panel as has been evidenced by stroboscopic inspection of the vibrating panel. Thus the resonant period of the panel is caused to be elevated so that the panel will not vibrate so readily to vibrations of low frequency.

Figure 2:
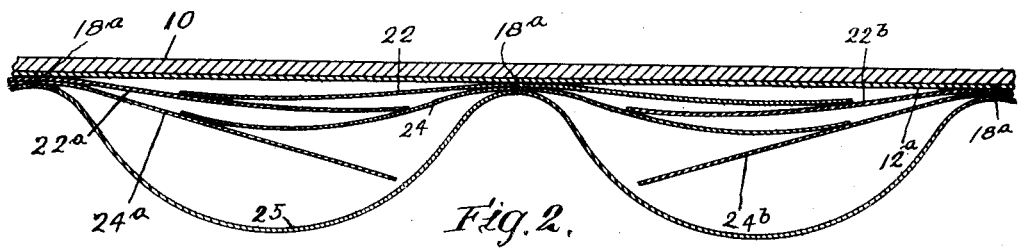
Fig. 2 is a sectional view illustrating a modified form of panel damping means arranged to provide for an increased amplitude of vibration of the vibration damping members.

The modification illustrated in Fig. 2 illustrates means for increasing the amplitude of movement of the damping structure. In this figure the vibration damping means comprises the supporting sheet 12a which is adapted to be fixed to the panel 10 as before, the sheet 12a being similar to the sheet 12. Attached to the sheet 12a at suitably spaced intervals by lines of stitching 18a are pairs of vibration damping sheets 22, 24; 22a, 24a; 22b, 24b; and so on. The sheets of each pair are free from attachment with each other and with the supporting sheet 12a except at the stitch lines. The ends of any pair of sheets terminate short of the stitch lines of the adjacent pairs of sheets so that the pairs of sheets are free from positive interconnection. The groups of sheets are interleaved as illustrated, the sheet 22b, for instance, being between the sheets 22 and 24 and the sheet 24b being under the sheet 24. Said sheets 22, 24; 22a, 24a; 22b, 24b preferably are composed of fairly light weight kraft paper which is resilient and hence can be flexed and will return to its initial position when the flexing force is removed. Due to the interleaving of the sheets the ends of the sheets, as for instance, the sheets 22, 24 bear against the sheets 22b and 24b intermediate the ends of the latter sheets. This provides a leverage amplification system by which the movement of the end of the sheet 22 causes an amplified movement of the end of the sheet 22b, which in turn causes an amplified movement of the end of the sheet 24 and a further amplification of movement of the end of the sheet 24b. With this arrangement the forced vibration or flapping of the sheets 22, 24 causes an increased amplitude of movement of the sheets in engagement therewith and thus such sheets fan the air more vigorously and hence provide increased damping effect. The vibration or flapping of the sheets is perhaps complicated by the fact that the individual sheets are set in motion by the vibration of the panel 10 but the structure, nevertheless, provides for an increase in the amount of movement of the sheets as is evidenced by stroboscopic inspection and hence an increased damping effect. The leaves are preferably enclosed within a light cover sheet 25 formed preferably of thin creped paper as creped tissue, attached to the structure at the stitch lines and hanging loosely therebetween and serving to prevent accidental displacement of the damping leaves by the hand. The cover sheet, however, is not intended to check the normal vibrations of the leaves.

Figure 3:
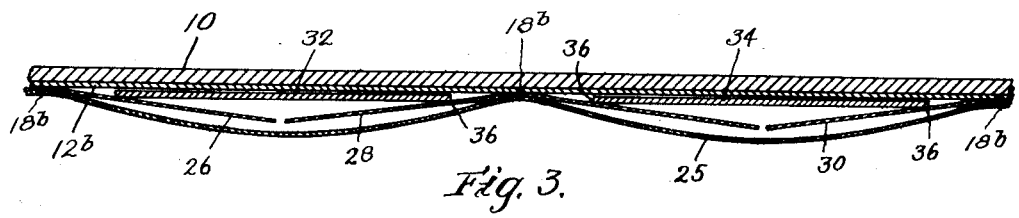
Fig. 3 illustrates a further modified form of the invention wherein an increased amplitude of vibration of the vibration damping members is obtained by the provision of inertia members.

Fig. 3 illustrates a further modification of the invention wherein the amplification of damping action is obtained in a somewhat different manner from that illustrated in Fig. 2. In the modification illustrated in Fig. 3 the supporting kraft sheet 12b is attached to the panel 10 as before. The supporting sheet 12b has secured thereto at spaced intervals by lines of stitching 18b a plurality of separate kraft paper sheets 26, 28, 30, etc. The confronting edges of the sheets 26 and 28; 28 and 30 are relatively close but do not engage or overlap each other. Interposed between the confronting sections of the sheets are other sheets 32, 34. Said sheets 32, 34 are free sheets, that is to say, they are not directly attached to any sheet of the structure but are merely interposed therein and rest at their edges and close to the lines of stitching 18b upon the underlying sheets 26, 28 and 30. The lines of contact 36 between the sheets 32, 34 and the underlying movable sheets 26, 28 and 30 are fulcrum points about which the free sections of the sheets 26, 28 and 30 can pivot. The sheets 32, 34 are composed preferably of heavy paper impregnated with asphalt or are of such construction to have sufficient inertia to remain more or less stationary relatively to the aforesaid leaves during the vibration of the panel 10. Hence by the vibration of the panel the sheets 26, 28 and 30 are caused to be vibrated about the fulcrum points 36 so that the free ends of the sheets move with increased amplitude and hence energetically fan the surrounding air and thus damp the vibration of the panel 10.

Figure 4:
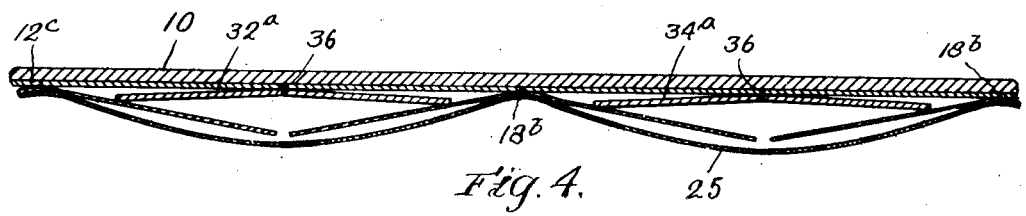
Fig. 4 illustrates a modification of Fig. 3 wherein the inertia members of Fig. 3 are secured to the vibration damping structure.

Fig. 4 illustrates a further modification of the form wherein the inertia sheets 32a, 34a, corresponding to the sheets 32, 34, of Fig. 3, are attached to the supporting sheet 12c by lines of stitching 36, the construction and the action being otherwise as has been described in connection with Fig. 3.

Figure 5:
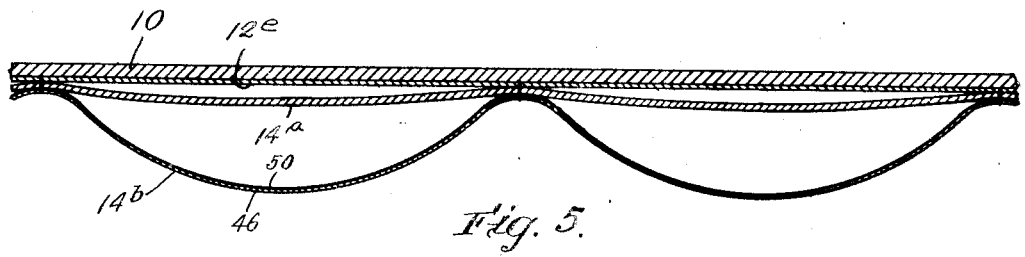
Fig. 5 is a view similar to Fig. 1, and illustrates heat insulating means forming a part of the damping structure.

Considerable heat can be transmitted through the usual metal roof of an automobile body into the interior thereof on a hot summer's day and especially when the roof is subjected to the direct rays of the sun. In accordance with the present invention heat insulating means is interposed between the interior of the body and the roof to reduce the transmission of heat into the interior of the body, the heat insulating means being an operative part of the panel deadening means. This form of the invention is illustrated in Fig. 5. The vibration damping means comprises the kraft paper supporting sheet 12e and the vibration damping sheets 14a and 14b, these sheets being attached to the supporting sheet by lines of stitching 18e and applied to the panel as described in connection with Fig. 1. The sheet 14a, as in Fig. 1, is a relatively heavy sheet as a paper sheet impregnated with asphalt. The sheet 14b is a lighter sheet and preferably comprises a thin paper sheet 46 having a bright heat reflective surface 50 that confronts the panel; or the sheet 14b may consist of a sheet of bright metal, as aluminium foil. The spacing of the sheets 14b and 14a is preferably around one-half an inch at the point of maximum separation between the sheets, so that the reflective surface can function effectively, and the air space between the sheets is preferably closed so that there is no definite circulation of air over the reflective surface. As thus arranged heat transmitted through the panel is reflected back towards the panel by the bright reflective surface 50 and thereby reduces the amount of heat that enters the interior of the body. The sheet 14b also acts as a vibration damping sheet in the manner heretofore described.

Sheet 14b may also be mounted with its polished surface facing downward in which case it will function as an insulator for outside heat due to the low heat emissivity value of its shiny surface, that is in retention of the heat, rather than through heat reflection.

Due to the absence of large masses of readily hygroscopic materials in the panel deadening means the weight and performance thereof remain substantially constant irrespective of variations of atmospheric humidity.

In making the deadening means, particularly that shown in Fig. 1, the various sheets, such as the sheets 12, 14, 16 are assembled in flat superimposed relation and stretched loosely together by the stitch lines 18. When applied to an automobile roof the sheets will fall apart or separate into positions as illustrated and described.

In the following claims the use of "heat reflecting" will be understood also to cover the reverse action of a heat reflective surface, i. e., heat emissivity.

I claim:

1. A panel structure comprising the combination of a vibratory panel, a plurality of leaves attached to said panel and having free ends arranged to be set into motion by the vibration of said panel whereby to damp such vibration.

2. A panel structure comprising the combination of a vibratory panel, and vibration damping means therefore comprising a plurality of leaves attached to said panel, said leaves being interleaved and the free end of one leaf bearing against an intermediate part of another leaf to increase the amplitude of movement of said latter leaf.

3. A panel structure comprising the combination of a vibratory panel, a plurality of movable leaves attached to said panel and having confronting ends, and inertia means overlying adjacent leaves and engaging them intermediate their ends, said inertia means being relatively unresponsive to the vibration of said panel, and the regions of engagement between said inertia means and said leaves constituting fulcrums about which said leaves can move to provide increased amplitude of movement of the free ends thereof.

4. Vibration damping means for a vibratory panel comprising a supporting sheet, a plurality of leaves secured to said sheet at spaced intervals and adapted to move in response to the vibration of the panel, the free ends of said leaves being interleaved and the end of one leaf bearing against an intermediate portion of another leaf whereby to amplify the movement of said latter leaf.

5. Vibration damping means for a vibratory panel including a plurality of leaves responsive to the panel vibrations and secured to said panel in spaced adjacent order, and inertia means overlying the adjacent leaves and bearing against both intermediate their ends, said inertia means being less responsive than said leaves to the panel vibrations and providing fulcrums about which said leaves can move with increased amplitude of movement of their free ends.

THEODORE M. PRUDDEN.